(12) United States Patent
Becher et al.

(10) Patent No.: US 7,968,484 B2
(45) Date of Patent: Jun. 28, 2011

(54) USE OF ADDITIVES TO IMPROVE MICROSTRUCTURES AND FRACTURE RESISTANCE OF SILICON NITRIDE CERAMICS

(75) Inventors: Paul F. Becher, Oak Ridge, TN (US); Hua-Tay Lin, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 949 days.

(21) Appl. No.: 11/851,540

(22) Filed: Sep. 7, 2007

(65) Prior Publication Data
US 2010/0267543 A1    Oct. 21, 2010

(51) Int. Cl.
*C04B 35/587* (2006.01)
(52) U.S. Cl. ............... 501/97.2; 501/97.3; 264/683
(58) Field of Classification Search ............ 501/97.2, 501/97.3; 264/683
See application file for complete search history.

(56) References Cited

U.S. PATENT DOCUMENTS

| | | | |
|---|---|---|---|
| 5,120,328 A | 6/1992 | Pyzik | |
| 5,312,785 A | 5/1994 | Pyzik et al. | |
| 5,674,793 A | 10/1997 | Hirao et al. | |
| 5,705,449 A | 1/1998 | Hirao et al. | |
| 5,914,286 A | 6/1999 | Collin et al. | |
| 5,922,629 A * | 7/1999 | Park et al. | 501/97.2 |
| 6,066,582 A * | 5/2000 | Collin et al. | 501/97.2 |
| 6,846,765 B2 * | 1/2005 | Imamura et al. | 501/97.2 |
| 7,749,932 B2 * | 7/2010 | Fukudome et al. | 501/97.2 |

OTHER PUBLICATIONS

Ziegler et al., Interface Structure and Atomic Bonding Characteristics in Silicon Nitride Ceramics, submitted to Science, Oct. 12, 2004.
Becher et al, Temperature-Dependent Viscosity of SiREAl-Based Glasses as a Function of N:O and RE:Al Ratios (RE=La, Gd, Y and Lu) J. Am. Ceram. Soc., 87 [7] 1274-1279 (2004).

* cited by examiner

*Primary Examiner* — Karl E Group
(74) *Attorney, Agent, or Firm* — Novak Druce + Quigg LLP; Gregory A. Nelson

(57) ABSTRACT

A high-strength, fracture-resistant silicon nitride ceramic material that includes about 5 to about 75 wt-% of elongated reinforcing grains of beta-silicon nitride, about 20 to about 95 wt-% of fine grains of beta-silicon nitride, wherein the fine grains have a major axis of less than about 1 micron; and about 1 to about 15 wt-% of an amorphous intergranular phase comprising Si, N, O, a rare earth element and a secondary densification element. The elongated reinforcing grains have an aspect ratio of 2:1 or greater and a major axis measuring about 1 micron or greater. The elongated reinforcing grains are essentially isotropically oriented within the ceramic microstructure. The silicon nitride ceramic exhibits a room temperature flexure strength of 1,000 MPa or greater and a fracture toughness of 9 MPa-m$^{(1/2)}$ or greater. The silicon nitride ceramic exhibits a peak strength of 800 MPa or greater at 1200 degrees C. Also included are methods of making silicon nitride ceramic materials which exhibit the described high flexure strength and fracture-resistant values.

19 Claims, 3 Drawing Sheets

USE OF ADDITIVES TO IMPROVE MICROSTRUCTURES AND FRACTURE RESISTANCE OF SILICON NITRIDE CERAMICS

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

CROSS REFERENCE TO RELATED APPLICATIONS

Not applicable.

FIELD OF THE INVENTION

The present invention relates to high-strength, fracture-resistant silicon nitride ceramics and methods of making the same.

BACKGROUND OF THE INVENTION

Silicon nitride ceramics are recognized for their excellent mechanical and physical properties, including good wear resistance, low coefficient of thermal expansion, good thermal shock resistance, high creep resistance and high electrical resistivity. In addition, silicon nitride ceramics are resistant to chemical attack. Due to these attributes, silicon nitride is useful in a variety of high wear and high temperature applications, such as cutting tools and parts in pumps and engines.

Failure of silicon nitride ceramics is generally associated with brittleness and flaws. To date, substantial efforts have been made to prepare silicon nitride ceramics with high fracture toughness and flexure strength. Prior art silicon nitride ceramics, however, have only demonstrated fracture toughness values of about 6-8 MPa-m$^{(1/2)}$ and flexure strength values of about 800 MPa, at room temperature. The values for the flexure strength at 1200° C. are about 600-650 MPa, which limits the usefulness of prior art silicon nitrides in high temperature applications.

Thus, it would be very desirable to have a silicon nitride ceramic that exhibits high flexure strength and fracture toughness at both ambient temperature and at elevated temperatures. Moreover, it would be highly desirable to have a process which would be reproducible, inexpensive, and efficient for preparing silicon nitride ceramics that exhibit high flexure strength and fracture toughness.

SUMMARY OR THE INVENTION

In one embodiment, the invention is drawn to a high-strength, fracture-resistant silicon nitride ceramic material that can include (i) about 5 to about 75 wt-% of elongated reinforcing grains of beta-silicon nitride, (ii) about 20 to about 95 wt-% of fine grains of beta-silicon nitride, and (iii) about 1 to about 15 wt-% of an amorphous intergranular phase that includes Si, N, O, a rare earth element and a secondary densification element. The silicon nitride ceramic can also include about 0.5 to about 15 wt-% of a secondary crystalline phase comprising oxides and oxynitrides of Si, the rare earth element, the secondary densification element, and combinations thereof. The fine grains can have a major axis of less than about 1 micron.

As used herein a "secondary densification additive" is a compound that can include a secondary densification element. A "secondary densification element" is an individual metal element.

As used herein, "rare earth element" is used to refer to any individual element that is included in the Lanthanide series or Group III of the periodic table. A rare earth element can be an element from the Lanthanide series. As used herein, "essentially isotropic" is used to describe silicon nitride components that are randomly oriented in at least two of three orthogonal axes.

As used herein, "beta-silicon nitride seeds" refers to beta-silicon nitride powders, elongated beta-silicon nitride particles, and combinations of both. As used herein, "elongated beta-silicon nitride particles" are elongated beta-silicon nitride seeds including, but not limited to, beta-silicon nitride whiskers, beta-silicon nitride fibers, and other elongated beta-silicon nitride particles.

The secondary densification element can be an element that is not a rare earth element. The secondary densification element can be aluminum, silicon, or magnesium.

The ceramic can include about 10 to about 75 wt-% of the elongated reinforcing grains. The elongated reinforcing grains can have a major axis measuring about 1 micron or greater and can have an aspect ratio of 2:1 or greater. The elongated reinforcing grains can have a major axis measuring about 2 microns or greater, or between about 4 microns and about 10 microns. The aspect ratio of the elongated reinforcing grains can be between 2:1 and 10:1, inclusive. Finally, the elongated reinforcing grains can be essentially isotropically oriented within the microstructure of the ceramic.

At room temperature, approximately 20 to 25° C., the silicon nitride ceramic can exhibit a flexure strength of 1,000 MPa or greater and a fracture toughness of 9 MPa-m$^{(1/2)}$ or greater. At 1200° C., the silicon nitride ceramic can exhibit a flexure strength of 800 MPa or greater.

The invention also includes a method of producing a high-strength, fracture-resistant silicon nitride ceramic material. The method includes providing a ceramic precursor mixture that includes, (a) about 60 to about 99.5 wt-% of an alpha-silicon nitride powder, (b) about 0.01 to about 15 wt-% of beta-silicon nitride seeds, having a major axis measuring about 10 microns or less and a minor axis measuring about 2 microns or less, (c) about 1 to about 10 wt-% of an oxide of a rare earth metal, and (d) about 0.01 to about 10 wt-% of a secondary densification additive. The ceramic precursor mixture can be formed into a high-strength, fracture-resistant silicon nitride ceramic material by sintering the ceramic precursor material at a temperature greater than or equal to about 1700° C. The components of the ceramic precursor mixture can be oriented essentially isotropically prior to the sintering step.

The ceramic precursor mixture can also include about 1 to about 10 wt-% elongated beta-silicon nitride particles. The beta-silicon nitride seeds can have an aspect ratio of 5:1 or less.

In another embodiment, the high-strength, fracture-resistant silicon nitride ceramic material can be produced using a ceramic precursor mixture that includes, (a) about 60 to about 99.5 wt-% of a silicon powder, (b) about 1 to about 10 wt-% of an oxide of a rare earth metal, (c) about 0.01 to about 5 wt-% of a densification additive; and (d) about 0.01 to about 15 wt-% beta-silicon nitride seeds, having a major axis measuring of about 10 microns or less and a minor axis measuring about 2 microns or less. The ceramic precursor mixture can be exposed to a nitrogen atmosphere and heated to a temperature below the melting point of the silicon powder, for a period sufficient to nitride the silicon powder. The ceramic precursor material, including the nitrided silicon powder, can then be sintered at a temperature of at least about 1700° C. in order to form a silicon nitride ceramic.

These and other embodiments are described in more detail below.

BRIEF DESCRIPTION OF THE DRAWINGS

A fuller understanding of the present invention and the features and benefits thereof will be obtained upon review of the following detailed description together with the accompanying drawings, in which.

DETAILED DESCRIPTION

Figure 1:
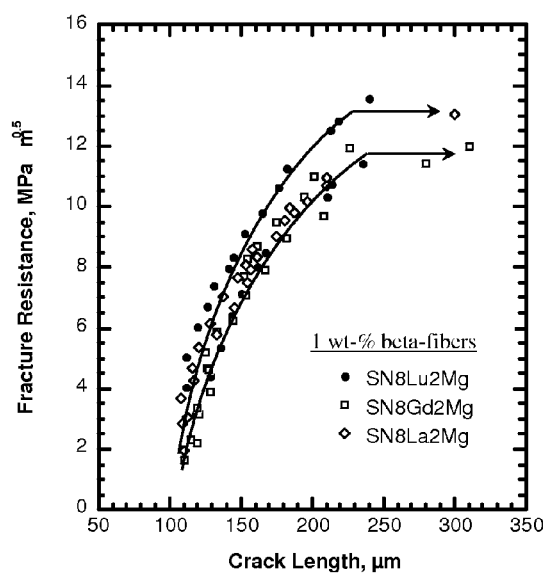
FIG. 1 is a graph showing fracture resistance as a function of crack length for inventive silicon nitride ceramics formed from a ceramic precursor mixture with 1% elongated beta-silicon nitride particles.

The invention includes a method of producing a high-strength, fracture-resistant silicon nitride ceramic material. One embodiment, is a method that includes providing a ceramic precursor mixture that can include (a) about 60 to about 99.5 wt-% of an alpha-silicon nitride powder, (b) about 0.01 to about 15 wt-% of beta-silicon nitride seeds, having a major axis measuring about 10 microns or less and a minor axis measuring about 2 microns or less, (c) about 1 to about 10 wt-% of an oxide of a rare earth metal, and (d) about 0.01 to about 10 wt-% of a secondary densification additive. The ceramic precursor mixture can be formed into a high-strength, fracture-resistant silicon nitride ceramic material by sintering the ceramic precursor material at a temperature greater than or equal to about 1700° C. The components of the ceramic precursor mixture can be oriented essentially isotropically prior to the sintering step.

The ceramic precursor mixture can include about 70 to about 99.5 wt-% of alpha-silicon nitride powder, or about 75 to about 99.5 wt-% of alpha-silicon nitride powder, or about 85 to about 99.5 wt-% of alpha-silicon nitride powder. The ceramic precursor mixture can include about 3 wt-% to about 10 wt-% of an oxide of a rare earth metal, or about 5 wt-% to about 10 wt-% of an oxide of a rare earth metal, or about 7 wt-% to about 10 wt-% of an oxide of a rare earth metal.

The ceramic precursor mixture can include about 0.5 to about 5 wt-% of a secondary densification additive, or about 1 to about 4 wt-% of a secondary densification additive, or about 1.5 to about 3 wt-% of a secondary densification additive.

The ceramic precursor mixture can include about 1 to about 10 wt-% beta-silicon nitride seeds. The beta-silicon nitride seeds can include beta-silicon nitride powder, elongated beta-silicon nitride particles, or a combination of both. The beta-silicon nitride seeds can have an aspect ratio of 5:1. In alternative embodiments, the beta-silicon nitride seeds can have an aspect ratio of 3:1 or less, or 2:1 or less, or 1.5:1 or less. The elongated beta-silicon nitride particles can have an aspect ratio of 3:1 or greater, or 4:1 or greater, or 5:1 or greater. The beta-silicon nitride seeds can have a major axis measuring 10 microns or less and a minor axis measuring 1 micron or less.

When present, the beta-silicon nitride powder in the ceramic precursor mixture can be at least 0.5 wt-%, or at least 1 wt-%, or at least 2 wt-%, or at least 5 wt-% of the ceramic precursor mixture. The amount of beta-silicon nitride powder in the ceramic precursor mixture can be 15 wt-% or less, or 10 wt-% or less, or 5 wt-% or less. The range of beta-silicon nitride powder in the ceramic precursor material can be any combination of these maximum values and minimum values.

Similarly, the amount of elongated beta-silicon nitride particles in the ceramic precursor mixture can be at least 0.5 wt-%, or at least 1 wt-%, or at least 2 wt-%. The amount of elongated beta-silicon nitride particles in the ceramic precursor mixture can be 15 wt-% or less, or 10 wt-% or less, or 5 wt-% or less, or 4 wt-% or less, or 3 wt-% or less, or 2 wt-% or less. The amount of elongated beta-silicon nitride particles can be any combination of these maximum values and minimum values and may be present with or without other beta-silicon nitride seeds of different dimensions and aspect ratios.

The flexure strength and fracture toughness of the invention can be achieved with or without the addition of elongated beta-silicon nitride particles. Unlike silicon nitride ceramics of the prior art, the ceramic precursor mixture used in the inventive method need not include elongated beta-silicon nitride particles in order to produce a high strength ceramic material. The combination of rare earth metal oxides and secondary densification additives, with or without elongated beta-silicon nitride particles, can be used to produce elongated reinforcing grains in the final silicon nitride ceramic.

The ceramic precursor material can be sintered until less than 10 wt-% of the original alpha-silicon nitride powder remains alpha-silicon nitride, or less than 5 wt-% of the alpha-silicon nitride powder remains alpha-silicon nitride, or less than 1 wt-% of the alpha-silicon nitride powder remains alpha-silicon nitride.

The amount of the secondary densification additive present in the ceramic precursor mixture can be at least 1 wt-%, or at least 2 wt-%, or at least 3 wt-%. The amount of the secondary densification additive can be 10 wt-% or less, or 8 wt-% or less, or 5 wt-% or less, or 4 wt-% or less or 3 wt-% or less. The range of secondary densification additive present in the ceramic precursor mixture can be any combination of these maximum and minimum values. Useful secondary densification additives include, but are not limited to, MgO, $SiO_2$, $Al_2O_3$, CaO, MgAl spinels, AlN, and combinations thereof.

One of the benefits of the claimed combination of rare earth metal oxides and secondary additives is that they enable the silicon nitride ceramics of the invention to be produced more rapidly and at lower temperatures than prior art silicon nitride ceramics. Thus, the sintering temperature can be between 1700° C. and 1850° C., inclusive, or between 1700° C. and 1800° C., inclusive, or between 1700° C. and 1750° C., inclusive.

In another embodiment, the high-strength, fracture-resistant silicon nitride ceramic material can be produced using a ceramic precursor mixture that includes, (a) about 60 to about 99.5 wt-% of silicon powder, (b) about 1 to about 10 wt-% of an oxide of a rare earth metal, (c) about 0.01 to about 10 wt-% of a densification additive; and (d) about 0.01 to about 15 wt-% beta-silicon nitride seeds. The ceramic precursor mixture can be exposed to a nitrogen atmosphere and heated to a temperature below the melting point of the silicon powder for a period sufficient to nitride the silicon powder. The ceramic precursor material, including the nitrided silicon powder, can then be sintered at a temperature of at least about 1700° C. in order to form a silicon nitride ceramic.

The melting temperature of silicon is approximately 1414° C. Thus, the nitriding step can take place at a temperature less than 1414° C. . The temperature for the nitriding step can be between about 1310° C. and about 1410° C., or between about 1350° C. and about 1400° C.

The ceramic precursor mixture can include between about 65 wt-% and 99.5 wt-% silicon powder, or between about 75 wt-% and 99.5 wt-% silicon powder, or between about 85 wt-% and 99.5 wt-% silicon powder. The ranges for the remaining ingredients of the ceramic precursor mixture can be any combination described herein.

In another embodiment, the invention is drawn to a high-strength, fracture-resistant silicon nitride ceramic material that can include (i) about 5 to about 75 wt-% of elongated reinforcing grains of beta-silicon nitride, (ii) about 20 to about 95 wt-% of fine grains of beta-silicon nitride, and (iii) about 1 to about 15 wt-% of an amorphous intergranular phase that includes Si, N, O, a rare earth element and a secondary densification element. The silicon nitride ceramic can also include about 1 to about 15 wt-% of a secondary crystalline phase comprising oxides and oxynitrides of Si, the rare earth element, the secondary densification element, and combinations thereof. The fine grains can have a major axis of less than about 1 micron.

The silicon nitride ceramic can include at least about 10 wt-% of the elongated reinforcing grains, or at least about 15 wt-% of the elongated reinforcing grains, or at least about 20 wt-% of the of the elongated reinforcing grains. The silicon nitride ceramic can include less than 65 wt-% of the elongated reinforcing grains, or less than 60 wt-% of the elongated reinforcing grains, or less than 55 wt-% of the elongated reinforcing grains, or less than 50 wt-% of the elongated reinforcing grains. The range of elongated reinforcing grains in the silicon nitride ceramic can include any combination of these minimum and maximum values.

The elongated reinforcing grains can have a major axis measuring about 1 micron or greater, or about 1.5 microns or greater, or about 2 microns or greater, or about 3 microns or greater. The elongated reinforcing grains can have a minor axis measuring about 2 microns or less, or about 1.5 microns or less, or about 1 micron or less.

The elongated reinforcing grains can have a major axis measuring between about 2 microns and about 10 microns and can also have an aspect ratio of 2:1 or greater. The elongated reinforcing grains can have a major axis measuring between about 4 microns and about 10 microns. The aspect ratio of the elongated reinforcing grains can be between 2:1 and 15:1, inclusive, or between 3:1 and 15:1, inclusive, or between 2:1 and 10:1, inclusive. Finally, the elongated reinforcing grains can be essentially isotropically oriented within the microstructure of the ceramic.

At room temperature of approximately 20 to 25° C., the inventive silicon nitride ceramics can exhibit a flexure strength of 1,000 MPa or greater and a fracture toughness of 9 Mpa-m$^{(1/2)}$ or greater. The inventive silicon nitride ceramics can exhibit a flexure strength of 1,050 MPa or greater, or 1,100 MPa or greater, or 1,150 or greater. The fracture toughness of the inventive silicon nitride ceramics can be 10 MPa-m$^{(1/2)}$ or greater, or 11 MPa-m$^{(1/2)}$ or greater, or 12 MPa-m$^{(1/2)}$ or greater, or 13 MPa-m$^{(1/2)}$ or greater.

The room temperature R-curve can have an average slope of 0.7 MPa-m$^{(1/2)}$ per micron, or 0.75 MPa-m$^{(1/2)}$ per micron, or 0.8 MPa-m$^{(1/2)}$ per micron, or 0.9 MPa-m$^{(1/2)}$ per micron.

The average slope is calculates using the fracture toughness where the initial 100 micron crack begins to propagate and ending at the failure point.

At 1200° C., the inventive silicon nitride ceramic can exhibit a flexure strength of 800 MPa or greater. Each of the flexure strength and fracture toughness values disclosed herein can be exhibited in one axis, or at least two orthogonal axes, or in all three orthogonal axes.

Examples

It should be understood that the Examples described below are provided for illustrative purposes only and do not in any way limit the scope of the invention.

Test Methods

In order to characterize microstructural features, samples were mechanically polished using a 0.5 μm diamond abrasive and then plasma etched using a mixture of $CF_4$ with approximately 4% oxygen for 2 to 5 minutes. The samples were then carbon coated and examined using a scanning electron microscope (SEM) while chemical analysis was accomplished using an energy dispersive spectrometer attachment. X-ray diffraction analysis methods were used to identify crystalline phases present in the finished silicon nitride ceramics.

Mechanical properties were determined using machined flexure bars of the silicon nitride ceramic that had polished (final polish with 3.mu.m diamond) tensile surfaces and champhered edges. Fracture resistance values were obtained using a multiple indent and fracture method. This method allows one to monitor the propagation of surface cracks introduced by hardness indentors. The reported test results were generated using Vickers 3 kg diamond pyramid hardness (DPH) indentors. The 3 kg DPH indentors were used to create three indentations, 200 μm apart, along the tensile axis and were centered in the middle of the sample width. The samples were tested using a top view four-point flexure test module that mounted on the stage of an optical microscope. This allowed one to monitor crack lengths as a function of the four-point flexure load. The four-point flexure test modules included top-view flexure test modules with 6.35 to 19.05 mm inner and outer spans, respectively. The applied load was controlled using a motor driven gear and screw-drive mechanism and the load signal from a solid-state load cell was displayed on a digital monitor. The test module was mounted on an x-y stage whose displacements were monitored using digital positioners and displayed digitally. This enabled monitoring of each indent crack and collection of data on the length of the cracks normal to the tensile axis as a function of applied load up to the point where the crack propagated unstably, which represented the critical toughness value.

The fracture resistance ($K_1$=applied stress intensity) as a function of surface crack length (c=0.5 C, the total surface length) for each applied stress ($\sigma_{appl}$) was estimated using equation (1):

$$K_I = \frac{8}{3\sqrt{\pi}} \sigma_{appl} \sqrt{c} \qquad (1)$$

This expression is typically used to calculate the critical fracture toughness as the crack geometry can change during crack growth under load.

The rectangular silicon nitride ceramic bars were tested using a four point flexure test device at a deflection rate of $5 \times 10^{-4}$ m/s using samples with as-ground tensile surfaces. The surface grinding employed a 320 grit diamond resin bonded wheel using a depth of cut of 0.01 cm with a final depth of cut of 0.0025 cm. The tests were also conducted with polished tensile surfaces. The edges of the flexure bars were champhered using a 30 micron diamond lapping wheel.

Effects of Elongated Beta-Silicon Nitride Particles

The following study demonstrated that elongated beta-silicon nitride particles do not need to be added to the ceramic precursor mixture in order to obtain the inventive silicon nitride ceramics and the unexpectedly high flexure strength and fracture toughness values associated with them. Table I, below, shows the weight percent composition of the ceramic precursor mixture used to produce silicon nitride ceramics for this study.

TABLE I

| Example # | Silicon Nitride Powder (wt-%) | Rare Earth Metal Oxide (type & wt-%) | Secondary Densification Additive (type & wt-%) | Elongated Beta-Silicon Nitride Particles (wt-%) |
|---|---|---|---|---|
| 1 | 89% | 8% $La_2O_3$ | 2% MgO | 1% |
| 2 | 89% | 8% $Gd_2O_3$ | 2% MgO | 1% |
| 3 | 89% | 8% $Lu_2O_3$ | 2% MgO | 1% |
| 1A | 90% | 8% $La_2O_3$ | 2% MgO | 0% |
| 2A | 90% | 8% $Gd_2O_3$ | 2% MgO | 0% |
| 3A | 90% | 8% $Lu_2O_3$ | 2% MgO | 0% |
| 4 | 89.5% | 8% $Gd_2O_3$ | 2% MgO | 0.5% |
| 5 | 88% | 8% $Gd_2O_3$ | 2% MgO | 2% |

In these examples, the silicon nitride powder was Ube E-10 (Ube Industries, Ltd, Tokyo), which contains approximately 95 wt-% alpha-silicon nitride powder and 5 wt-% beta-silicon nitride powder. Where used, the elongated beta-silicon nitride particles were derived from Ube SN-1 "beta-silicon nitride whiskers" that were separated using air classification. The elongated beta-silicon nitride particles had an "average dimension" of approximately 1.9 microns and diameters in the range of 0.4 to 0.8 microns. The "average dimension" reflects the fact that the rod-like shape of the whiskers alters the separation behavior. Other study materials include MgO obtained from Alfa Aesar of Ward Hill, MA; $Lu_2O_3$ and $Gd_2O_3$ obtained from Stanford Materials Corporation of Viejo, Calif.; and $La_2O_3$ obtained from Molycorp, Inc., of Mountain Pass, Calif. Although these specific materials were used for purposes of the study, the invention is not so limited and materials obtained from other sources and manufacturers can be employed in the current invention.

In order to blend the ceramic precursor mixture, the Ube E-10 silicon nitride powder and the secondary densification additive were first attritor milled for two hours using 2 mm silicon nitride balls with isopropanol. Where used, the elongated beta-silicon nitride particles were added to the milled powder mixture and this combination was attritor milled for an additional 15 minutes. The isopropanol-powder mixture was then poured through a 90 micron sieve to separate the milling media from the powder-isopropanol mixture. The powder-isopropanol mixture was then air-dried in a hood for 24 hours. After drying, the ceramic precursor mixture was gently ground and passed through a 425 μm sieve. A desired amount of the dried ceramic precursor mixture was then placed into a graphite die and a uniaxial pressure of approximately 20 MPa was applied using graphite rams. The loaded die assembly was then placed into a hot press, which was evacuated and backfilled with nitrogen. Exemplary hot presses include model HP-12×12-G-2200-VG available from Materials Research Furnaces, Inc., Suncook, N.H. The large billets thus produced were densified at 1800° C. for 1 hour under an applied uniaxial pressure of 22 MPa with nitrogen continuously flowing through the chamber.

The room temperature flexure strengths of the compositions from this study, along with their peak fracture toughness are shown in Table II. The flexure strengths include both the average value and the standard deviation. The inventive silicon nitride ceramics made with rare earth metal oxides and MgO, both with and without the addition of elongated beta-silicon nitride particles, each exhibit high flexure strength and high fracture toughness values.

TABLE II

Table II. Room Temperature Fracture Properties of Self-Reinforced $Si_3N_4$ Ceramics with 2% MgO and 8% rare earth metal oxide, both with and without elongated beta-silicon nitride particles.

| Sample # | Rare earth metal oxide | Flexure Strength[a] MPa | Fracture Toughness MPa-m$^{(1/2)}$ |
|---|---|---|---|
| 1 wt-% elongated β particles | | | |
| 1 | $La_2O_3$ | 1145 ± 20 (2) | 13 |
| 2 | $Gd_2O_3$ | 1130 ± 40 (2) | 12 |
| 3 | $Lu_2O_3$ | 1105 ± 10 (2) | 13 |
| No elongated β particles | | | |
| 1A (8La2Mg) | $La_2O_3$ | 1104 ± 108 (8) | 10-11 |
| 2A (8Gd2Mg) | $Gd_2O_3$ | 1226 ± 212 (9) | 11-12 |
| 3A (8Lu2Mg) | $Lu_2O_3$ | 1040 ± 172 (9) | 10-11 |
| 8 wt-% $Gd_2O_3$, 2 wt-% MgO and X wt-% elongated β particles | | | |
| 4 (X = 0.5 wt-%) | $Gd_2O_3$ | | 12.5 |
| 2 (X = 1 wt-%) | $Gd_2O_3$ | | 12 |
| 5 (X = 2 wt-%) | $Gd_2O_3$ | | 12.5 |

[a]The average value and the standard deviation (number of data points).

Examination of the increase in the resistance to crack extension with increase in applied stress (i.e., R-curve behavior) sought to determine the impact of the toughening effects due to the introduction of the elongated reinforcing grains. The R-curve response was determined by using a controlled half-penny shaped surface crack introduced by placing Vickers indentations in the surface of flexure bars and monitoring the growth of the crack as the applied stress is increased.

The orientation of the tensile surface was always normal to the hot pressing axis such that the crack plane was parallel to the hot pressing axis for each composition. For those samples in which elongated beta-silicon nitride particles were present in the ceramic precursor mixture, the hot pressing induced some degree of preferred orientation of the elongated beta-silicon nitride particles during the compaction of the ceramic precursor material. This leads to a slight tendency for the long axis of the elongated beta-silicon nitride particles to be reoriented towards the plane normal to the hot pressing axis; however, the remaining ceramic precursor material ingredients and the elongated reinforcing grains formed during the sintering process remain essentially isotropic. In fact, pole figure analysis did not reveal any detectable texture associated with either the elongated beta-silicon nitride particles or the large number of elongated reinforcing grains generated during densification at 1800° C. Thus, any potentially preferred orientation caused by the compression does not significantly impact the improved fracture toughness or flexure strength exhibited by the inventive silicon nitride ceramics. It is believed this is because the inventive silicon nitride ceramics internally generate a significant amount of elongated reinforcing grains, especially compared to the prior art.

Figure 2:
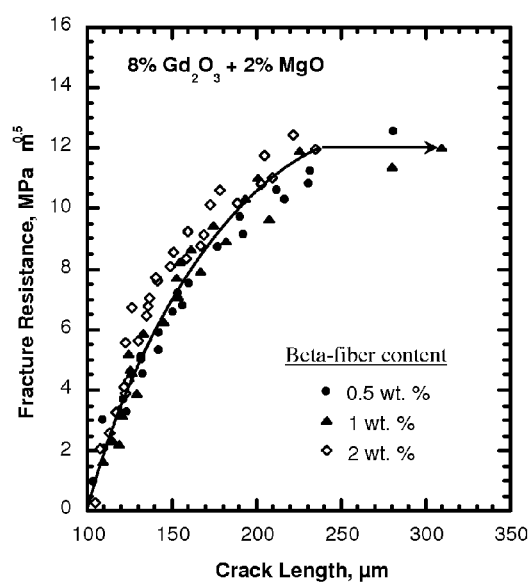
FIG. 2 is a graph showing fracture resistance as a function of crack length for inventive silicon nitride ceramics formed from a ceramic precursor mixture with elongated beta-silicon nitride particles present in various amounts (0.5 wt-%, 1 wt-% and 2 wt-%).

As can be seen in FIGS. 1 and 2, the fracture toughness for these materials exceeds 10 MPa-m$^{(1/2)}$, which is twice that for available commercial silicon nitride ceramics. In fact, many of the fracture toughness values for the inventive silicon nitride ceramics are nearly three times higher than those for commercial materials. Comparing the results in FIGS. 1 and 2, it is apparent that small increases in the beta-seed additions to the initial ceramic precursor mixture have little effect on the maximum toughness.

The fracture resistance curves exhibit the highly desirable rapid rise as the crack extends. This feature means that a crack experiences increasing resistance to its growth as the applied stress increases. This will translate into increased damage resistance. The curves shown in FIG. 1 have R-curve slopes of 0.769 MPa-m$^{(1/2)}$ per micron and 0.909 MPa-m$^{(1/2)}$ per micron, respectively.

While it is not necessary to practice the invention, it is believed that the unexpectedly high fracture toughness and flexure strength values are a direct result of the self-reinforced microstructure produced using the inventive method. The combination of rare earth metal oxide and secondary densification additives produces a microstructure with a large quantity of elongated reinforcing grains, even when elongated beta-silicon nitride particles are not added to the ceramic precursor mixture. It is believed that this results because the combination of rare earth metal oxides and secondary densification additives (i) reduces the temperature at which the conversion from alpha-silicon nitride to beta-silicon nitride occurs and (ii) strongly encourages anisotropic beta-silicon nitride grain growth. Because of this, even generally equiaxed alpha-silicon nitride particles can be transformed into a silicon nitride ceramic with a substantial amount of elongated reinforcing grains.

Figure 3:
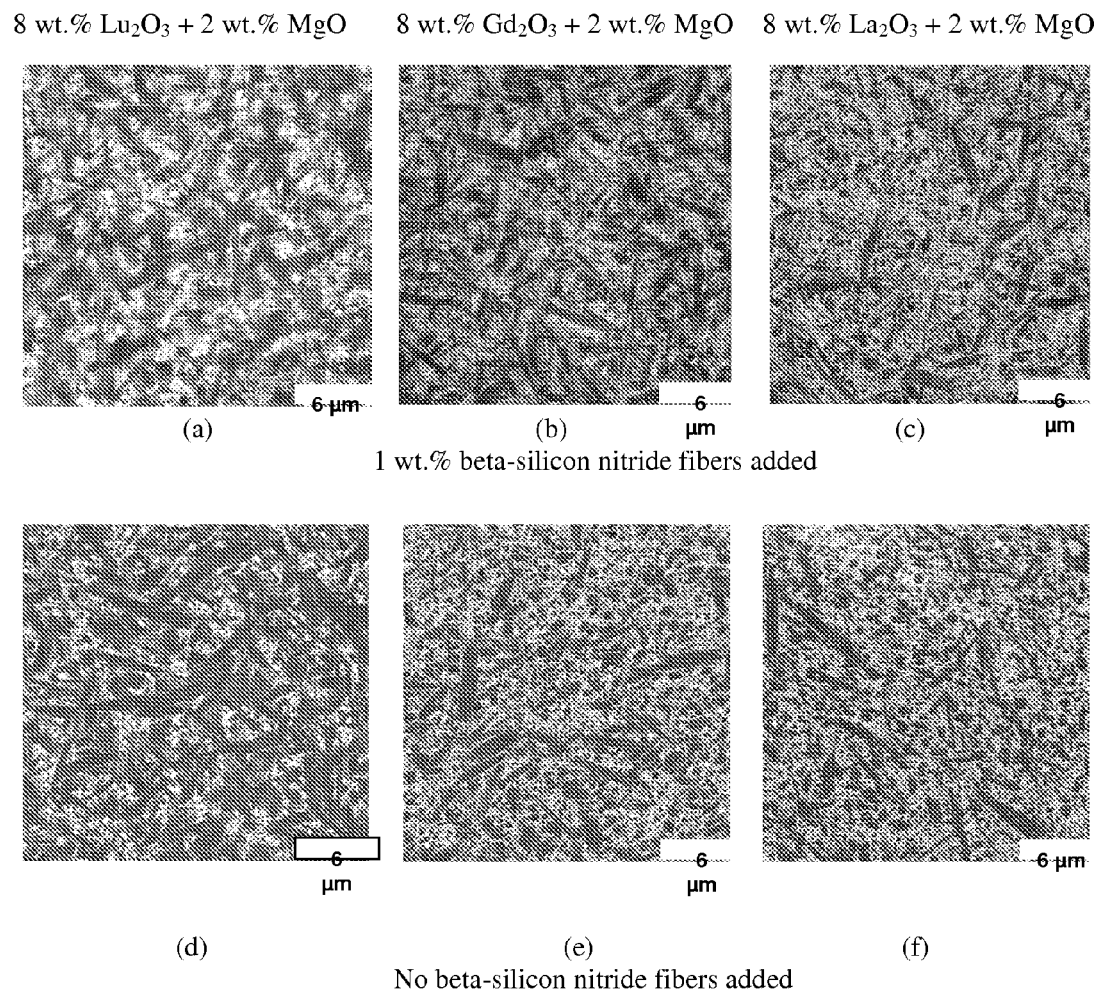
FIG. 3 includes micrographs showing the morphology of various inventive silicon nitride ceramics formed with and without elongated beta-silicon nitride particles.

FIG. 3, demonstrates this effect for rare earth metal oxides across the Lanthanide series, including $Lu_2O_3$, $Gd_2O_3$, and $La_2O_3$. As can be seen in the micrographs, the microstructure is highly reinforced with elongated reinforcing grains whether the ceramic precursor mixture used to form the silicon nitride ceramic included elongated beta-silicon nitride particles or not. This is a an unexpected benefit and, it is believed, the explanation for the superior mechanical properties exhibited by the inventive silicon nitride ceramics.

Rare Earth Metals Oxides and Secondary Densification Additives

The second study demonstrates that the unexpected room temperature flexure strength and fracture toughness associated with the inventive silicon nitride ceramics exists across the entire range of rare earth elements. The silicon nitride ceramics for this evaluation were made according to the methods described above using the ceramic precursor mixtures described in Table III.

TABLE III

| Example # | Silicon Nitride Powder* (wt-%) | Rare Earth Metal Oxide (type & wt-%) | Secondary Densification Additive (type & wt-%) | Elongated Beta-Silicon Nitride Particles (wt-%) |
|---|---|---|---|---|
| 1 | 89% | 8% $La_2O_3$ | 2% MgO | 1% |
| 2 | 89% | 8% $Gd_2O_3$ | 2% MgO | 1% |
| 3 | 89% | 8% $Lu_2O_3$ | 2% MgO | 1% |
| 6 | 89% | 8% $La_2O_3$ | 2% $Al_2O_3$ | 1% |
| 7 | 89% | 8% $Gd_2O_3$ | 2% $Al_2O_3$ | 1% |
| 8 | 89% | 8% $Lu_2O_3$ | 2% $Al_2O_3$ | 1% |
| 9 | 89% | 8% $La_2O_3$ | 2% $SiO_2$ | 1% |
| 10 | 89% | 8% $Gd_2O_3$ | 2% $SiO_2$ | 1% |
| 11 | 89% | 8% $Lu_2O_3$ | 2% $SiO_2$ | 1% |

The flexure strength and fracture toughness were measured for each of the resulting silicon nitride ceramic materials. The mechanical properties are shown below in Table IV.

TABLE IV

| Sample # | Rare Earth Oxide and Secondary Densification Additive | Flexure Strength$^a$ MPa @ 22° C. | Fracture Toughness MPa-m$^{(1/2)}$ @ 22° C. |
|---|---|---|---|
| 1 | $La_2O_3$, MgO | 1145 ± 20 (2) | 11.5 |
| 2 | $Gd_2O_3$, MgO | 1130 ± 40 (2) | 12 |
| 3 | $Lu_2O_3$, MgO | 1105 ± 10 (2) | 12.5 |
| 6 | $La_2O_3$, $Al_2O_3$ | 710 ± 159 (4) | 9 |
| 7 | $Gd_2O_3$, $Al_2O_3$ | 858 ± 143 (5) | 10 |
| 8 | $Lu_2O_3$, $Al_2O_3$ | 710 ± 204 (3) | 10 |
| 9 | $La_2O_3$, $SiO_2$ | 947 ± 121 (2) | 12 |
| 10 | $Gd_2O_3$, $SiO_2$ | 997 ± 156 (5) | 10 |
| 11 | $Lu_2O_3$, $SiO_2$ | 942 ± 20 (2) | 12 |

$^a$The average value and the standard deviation (number of data points).

The data demonstrates that the fracture toughness values for the inventive silicon nitride ceramic compounds consistently exceed 10 MPa-m$^{(1/2)}$ and can be 11 MPa-m$^{(1/2)}$ or greater, or 12 MPa-m$^{(1/2)}$ or greater. As noted above, these values were unexpected in view of the significantly lower values exhibited by prior art silicon nitride ceramics.

Temperature

In order to study the alpha to beta phase transformation of the alpha-silicon nitride powder, ceramic precursor mixtures containing 8 wt-% rare earth metal oxides ($Lu_2O_3$, $Gd_2O_3$, and $La_2O_3$) and 2 wt-% MgO, with no elongated beta-silicon nitride particles, were hot pressed at several temperatures between 1450° C. to 1800° C. for one hour. X-ray diffraction analysis was performed to (1) determine the α-to-β-phase ratios based on the intensities of the peaks of the alpha and beta phases respectively and (2) identify any secondary crystalline phases that might be present. In addition to these samples without elongated beta-silicon nitride particles, a similar analysis of the alpha-to-beta phase transformation was conducted on several samples containing 1 wt. % of elongated beta-silicon nitride particles. All of the samples with the elongated beta-silicon nitride particles were hot pressed at 1800° C. for one hour.

Figure 4:
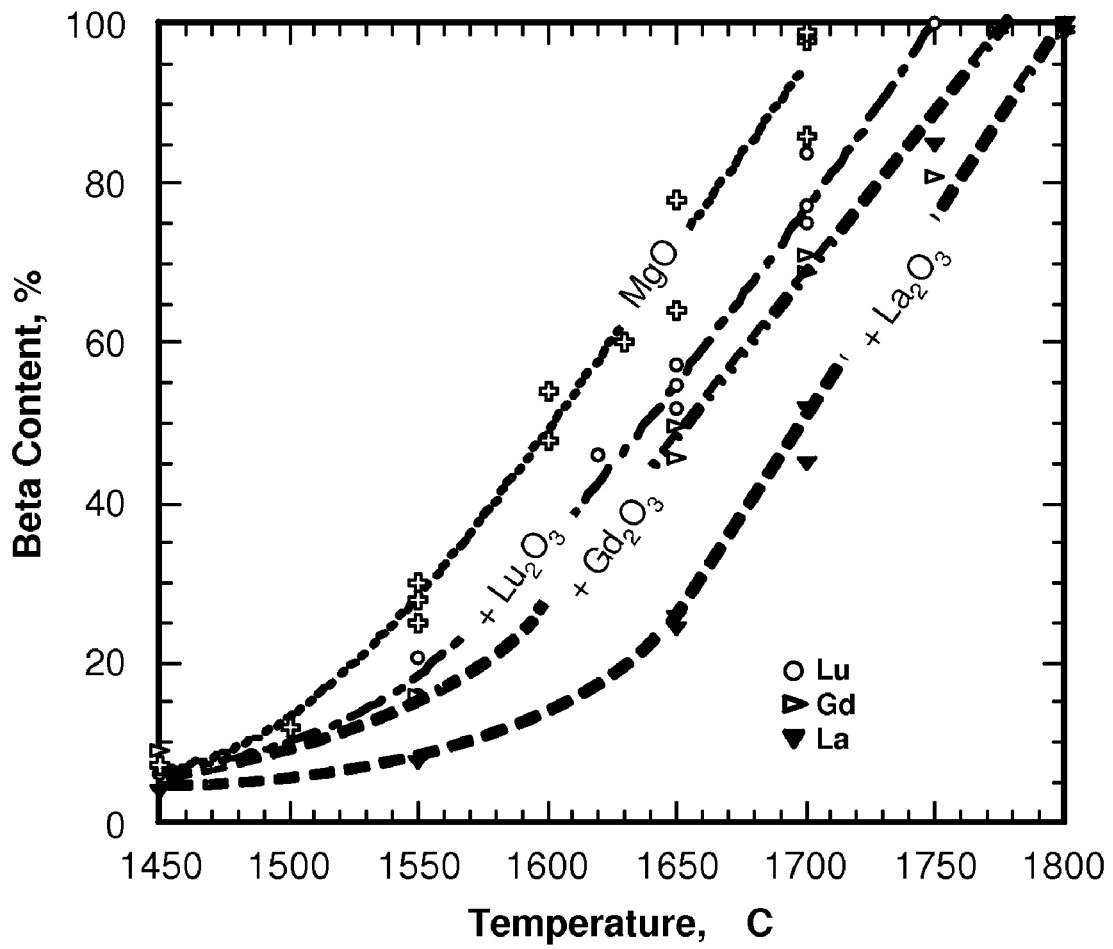
FIG. 4 is a graph showing the conversion from alpha-silicon nitride to beta-silicon nitride as a function of sintering temperature for inventive silicon nitride ceramics formed with different rare earth metal oxides.

The influence of rare earth metal oxides on the transformation of the alpha-silicon nitride to the beta-silicon nitride phase with MgO as the secondary additive is shown in FIG. 4 along with data for 5% MgO alone. The samples hot pressed at 1450° C. exhibited beta-silicon nitride contents comparable to that of the as-received Ube E10 silicon nitride powder, i.e. approximately 5 wt-% of the total silicon nitride powder.

Where the samples with elongated beta-silicon nitride particles overlap with those that do not, the results for the samples with elongated beta-silicon nitride particles and without elongated beta-silicon nitride particles are the same. At the same time, the densities of the various compositions reach levels where only closed pores should exist when hot pressed at 1550° C.

As shown, the difference in the temperature range for a given transformation percentage associated with $Gd_2O_3$ is approximately 50° C. higher than that with $Lu_2O_3$, while the temperature is approximately 100° C. higher with $La_2O_3$.

Turning to the secondary crystalline phases. These secondary crystalline phases were identified by x-ray diffraction. After densifying and/or sintering the samples for 1 hour at temperatures between 1450° C. and 1800° C., the amounts of secondary crystalline phases were measured. The secondary crystalline phases detected included oxides and oxynitrides of Si, the rare earth elements, the secondary densification element, and combinations thereof. For the ceramics made using 8 wt-% $Lu_2O_3$, x-ray diffraction detected between 6 wt-% and 10 wt-% of secondary crystalline phases. The ceramics made using 8 wt-% $Gd_2O_3$, exhibited less than 5 wt-% of a secondary crystalline phase at temperatures between 1450° C. and 1750° C., while no secondary crystalline phase was detectable at 1800° C. Where 8 wt-% $La_2O_3$ was used, the was less than 7 wt-% secondary crystalline phase at 1450° C. and no detectable crystalline phase at temperatures between 1550° C. and 1800° C.

It is noteworthy that the extent of the formation of secondary crystalline phases decreased as one goes from Lu to La across the Lanthanide series. In addition, the amount of secondary crystalline phases decreases as temperature increases.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. A high-strength, fracture-resistant silicon nitride ceramic material comprising
   about 5 to about 75 wt-% of elongated reinforcing grains of beta-silicon nitride, wherein the elongated reinforcing grains have a major axis measuring about 1 micron or greater and an aspect ratio of 2:1 or greater;
   about 20 to about 95 wt-% of fine grains of beta-silicon nitride, wherein the fine grains have a major axis less than about 1 micron; and
   about 1 to about 15 wt-% of an amorphous intergranular phase comprising Si, N, O, a Lanthanide series element, and a secondary densification additive comprising a secondary densification element;
   wherein said elongated reinforcing grains are essentially isotropically oriented within a microstructure of the ceramic.

2. The ceramic of claim 1, wherein at room temperature said ceramic exhibits a peak flexure strength of 1,000 MPa or greater and a peak fracture toughness of 9 MPa-m$^{(1/2)}$ or greater.

3. The ceramic of claim 1, wherein the elongated reinforcing grains have a major axis measuring about 2 microns or greater.

4. The ceramic of claim 1, wherein the aspect ratio of said elongated reinforcing grains is between 2:1 and 10:1, inclusive.

5. The ceramic of claim 1, comprising about 10 to about 75 wt-% of said elongated reinforcing grains.

6. The ceramic of claim 1, further comprising about 0.5 to about 15 wt-% of a secondary crystalline phase comprising oxides and oxynitrides of Si, the lanthanide series element, the secondary densification element, and combinations thereof.

7. The ceramic of claim 1, wherein the secondary densification element is not a rare earth element.

8. The ceramic of claim 1, wherein the secondary densification additive is selected from the group consisting of oxides of aluminum, oxides of silicon, oxides of magnesium, and combinations thereof.

9. The ceramic of claim 1, wherein at 1200 degrees C. said ceramic exhibits a peak strength of 800 MPa or greater.

10. The ceramic of claim 9, wherein the secondary densification additive is selected from the group consisting of oxides of aluminum, oxides of silicon, oxides of magnesium, and combinations thereof.

11. A method of producing a high-strength, fracture-resistant silicon nitride ceramic composition according to claim 1 comprising the steps of:
    providing a ceramic precursor mixture comprising:
    (a) about 60 to about 99.5 wt-% of an alpha-silicon nitride powder,
    (b) about 0.01 to about 15 wt-% of beta-silicon nitride seeds, having a major axis measuring less than 10 microns and a minor axis measuring less than 2 microns,
    (c) about 1 to about 10 wt-% of an oxide of a lanthanide series element, and
    (d) about 0.01 to about 10 wt-% of a secondary densification additive; and
    sintering said ceramic precursor mixture at a temperature of at least about 1700° C. in order to form said silicon nitride ceramic, wherein components of the ceramic precursor mixture are oriented essentially isotropically prior to the sintering step, and
    wherein at room temperature said ceramic exhibits a peak strength of 1,000 MPa or greater and a peak fracture toughness of 9 MPa-m$^{(1/2)}$ or greater.

12. The method of claim 11, wherein the ceramic precursor mixture comprises between about 0.01 and about 10 wt-% elongated beta-silicon nitride particles.

13. The method of claim 11, wherein the beta-silicon nitride seeds have an aspect ratio of 5:1 or less.

14. The method of claim 11, wherein the secondary densification additive does not comprise a rare earth element.

15. The method of claim 11, wherein the secondary densification additive is selected from the group consisting of oxides of aluminum, oxides of silicon, oxides of magnesium and combinations thereof.

16. A method of producing a high-strength, fracture-resistant silicon nitride ceramic composition according to claim 1 comprising the steps of:
    providing a ceramic precursor mixture comprising:
    (a) about 60 to about 99.5 wt-% of a silicon powder,
    (b) about 1 to about 10 wt-% of an oxide of a the lanthanide series element,
    (c) about 0.01 to about 5 wt-% of a densification additive, and
    (d) about 0.01 to about 15% beta-silicon nitride seeds, having a major axis measuring about 10 microns or less and a minor axis measuring about 2 microns or less;
    nitriding said silicon powder by exposing said ceramic precursor mixture to a nitrogen atmosphere and heating said ceramic precursor mixture at a temperature below the melting point of the silicon powder, for a period sufficient to nitride the silicon powder; and
    sintering said ceramic precursor mixture at a temperature of at least about 1700° C. in order to form a sintered silicon nitride ceramic, wherein components of the ceramic precursor mixture are oriented essentially isotropically prior to the sintering step, and wherein at room temperature said sintered silicon nitride ceramic exhibiting a peak strength of 1,000 MPa or greater and a peak fracture toughness of 9 MPa-m$^{(1/2)}$ or greater.

17. The method of claim 16, wherein the ceramic precursor mixture comprises between about 0.01 and about 10 wt-% elongated beta-silicon nitride particles.

18. The method of claim 16, wherein the beta-silicon nitride seeds have an aspect ratio of about 5:1 or less.

19. The ceramic of claim 1, wherein the secondary densification additive comprises MgO, $SiO_2$, $Al_2O_3$, MgAl spinels, AlN, and combinations thereof.

* * * * *